Sept. 3, 1946.                H. McCARTHY                  2,406,957
                        HANDWHEEL ATTACHING MEANS
                           Filed Aug. 8, 1944

INVENTOR.
HARRY McCARTHY.
BY
his ATTORNEY.

Patented Sept. 3, 1946

2,406,957

UNITED STATES PATENT OFFICE 2,406,957

HANDWHEEL ATTACHING MEANS

Harry McCarthy, Kewanee, Ill., assignor to Walworth Patents, Inc., Boston, Mass., a corporation of Massachusetts Application August 8, 1944, Serial No. 548,618

4 Claims. (Cl. 287—53)

This invention relates to securing means for handles and more particularly to improved means for connecting the stems and handwheels of valves against relative rotation.

Connections of the stated type generally have a tapered square formed on the valve stem and terminating in a reduced threaded extremity. The valve handle or wheel is suitably cored or otherwise formed with a tapered square aperture for fitting more or less snugly upon the squared stem portion and is secured thereon by means of a nut engaging the threaded end. These arrangements are subject to various defects and disadvantages which this invention seeks to overcome.

Among the drawbacks encountered in prior constructions is the difficulty of securing a tight fit between the machined stem square and the cored handwheel. It is apparent that the tapered shape of the aperture does not lend itself to a broaching operation or other convenient machining process for sizing purposes. Another prime disadvantage is the necessity for using a reduced threaded portion which weakens the stem at that point. Moreover, the prior constructions are generally rendered more expensive to manufacture due to the plurality of machined surfaces on the stem.

An object of the invention is to ensure a snug and lasting fit between a handle and a stem.

Another object of this invention is to eliminate weakened parts which may become broken off during installation or use.

Another object of this invention is to obtain the foregoing advantages while reducing the cost of manufacture of such devices.

Other objects and advantages will become apparent from the following description taken in connection with the accompanying drawing wherein.

Figure 1:
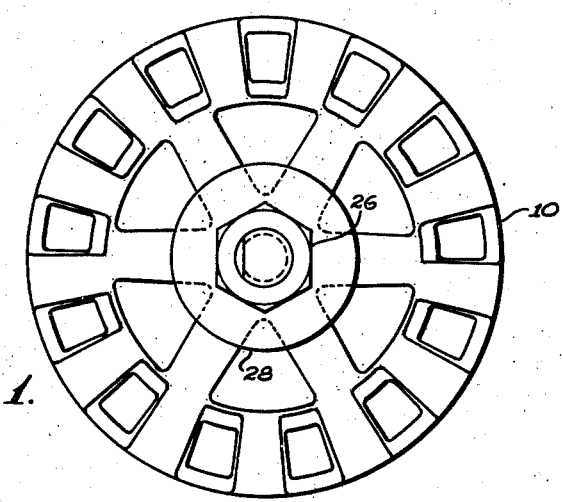
Fig. 1 is a plan view of the improved handle and stem construction.
Figure 2:
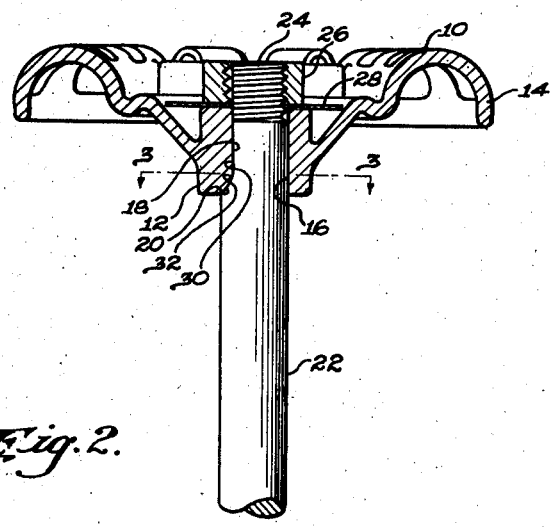
Fig. 2 is a cross section.
Figure 3:
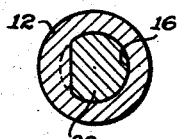
Fig. 3 is a section on line 3—3 of Fig. 2.

Referring more particularly to the drawing, the invention is shown as applied to a conventional non-heating or ventilated handwheel 10 for valves having a hub 12 located below the plane of the rim 14 thereof. The hub 12 is provided with an aperture 16 therethrough of non-circular form, specifically D-shaped in cross section. The flat section 18 of the D-shaped aperture preferably has one edge 20 thereof rounded for a purpose apparent hereinafter.

A cylindrical stem 22, which may be a valve stem of otherwise conventional form, has one end provided with a non-circular portion, also specifically of D-shaped cross-section, for engaging the complemental aperture 16 in the handwheel. Preferably, the D-shaped stem portion projects beyond the handwheel hub 12 but terminates below the plane of the rim 14 thereof. The projection 24 so formed is threaded for the reception of a nut 26 which may abut a suitable washer or nameplate 28 resting on the surface of the hub 12. As the nut 26 and associated parts lie below the rim 14 no interference or hazard is encountered by the operator's hand.

It will be apparent that the threads on projection 24 may conveniently be formed prior to milling the flat section 30 of the D-shaped stem portion. The milling operation produces a rounded shoulder 32 against which the rounded edge 20 of the hub can be forced by the nut 26 in wedging relation. Moreover, the aperture 16 lends itself to the use of a broaching operation which can be conducted to precise measurements. A snug and lasting fit between the handwheel and stem is thus secured.

It may not be essential to machine both the aperture and the stem, or either of them, to secure a reasonably tight fit. The wedging relation established by the shoulder 20 and edge 32 as described may be relied upon to give the required security against loosening without close engagement between the D-shaped aperture and the D-shaped stem portion. Also, the stem shoulder 20 may be tapered instead of rounded and the edge 32 may be left unrounded if desired. The threaded projection 24 is disclosed as of substantially the same diameter as the stem 22. An appreciable reduction in the size of this projection diameter would tend to weaken the stem at this point but would not otherwise defeat the purposes of this invention. All these and other modifications will be apparent and it is to be understood that the illustrative embodiment is not to be taken as limiting the scope of this invention as set forth in the appended claims.

I claim:

1. Securing means of the character described comprising a handle having an aperture therethrough longitudinally flattened on one side thereof defining a segmental-circular cross-section, a stem having a flattened side defining a complemental segmental-circular portion engaging the walls of said aperture and projecting therebeyond, said projection being threaded on the unflattened side thereof, and a nut engaging said threaded portion of said projection for retaining said handle on said stem.

2. Securing means of the character described comprising a handle having an aperture therethrough longitudinally flattened on one side thereof defining a segmental-circular cross-section, a cylindrical stem having a flattened side defining a complemental segmental-circular portion engaging the walls of said aperture and projecting therebeyond, said projection being threaded on the unflattened side thereof and being of substantially the same diameter as said stem, and a nut engaging said threaded portion of said projection for retaining said handle on said stem.

3. Securing means of the character described comprising a handle having an aperture therethrough longitudinally flattened on one side defining a D-shaped cross-section, a cylindrical stem having a flattened side portion defining a complemental D-shaped cross-section engaging the walls of said aperture and projecting therebeyond, said portion defining a shoulder on said stem, and means engaging with the unflattened portion of said projection for retaining said handle on said stem in wedging relation with said shoulder.

4. Securing means of the character described comprising a handle having an aperture therethrough longitudinally flattened on one side defining a D-shaped cross-section, a cylindrical stem having a flattened side portion defining a complemental D-shaped cross-section engaging the walls of said aperture and projecting therebeyond, said portion defining a shoulder on said stem and said projection having threads on the unflattened side thereof of substantially the same diameter as said stem, and a nut engaging said threads for retaining said handle on said stem in wedging relation with said shoulder.

HARRY McCARTHY.